United States Patent [19]

Fukaumi et al.

[11] Patent Number: 5,377,073
[45] Date of Patent: Dec. 27, 1994

[54] STACKED TYPE SOLID ELECTROLYTIC CAPACITOR

[75] Inventors: Takashi Fukaumi; Yoshihiko Saiki; Toshihiko Nishiyama; Satoshi Arai, all of Tokyo, Japan

[73] Assignee: NEC Corporation, Japan

[21] Appl. No.: 8,193

[22] Filed: Jan. 25, 1993

[30] Foreign Application Priority Data

Jan. 27, 1992 [JP] Japan .................. 4-012254

[51] Int. Cl.⁵ ............... H01G 1/14; H01G 9/00
[52] U.S. Cl. .................... 361/540; 361/541; 361/523; 29/25.03
[58] Field of Search .......... 361/541, 423, 540, 528, 361/529, 532, 533, 538; 29/25.03

[56] References Cited

U.S. PATENT DOCUMENTS

| | | | |
|---|---|---|---|
| 4,282,645 | 8/1981 | Thompson et al. | 29/570 |
| 4,805,074 | 2/1989 | Harakawa et al. | 361/525 |

FOREIGN PATENT DOCUMENTS

| | | | |
|---|---|---|---|
| 0112720 | 5/1989 | Japan | 29/25.03 |
| 0171223 | 7/1989 | Japan | 29/25.03 |
| 3-21006 | 1/1991 | Japan . | |
| 3-116813 | 5/1991 | Japan . | |
| 3-145115 | 6/1991 | Japan . | |

Primary Examiner—Geoffrey S. Evans
Assistant Examiner—Michael D. Switzer
Attorney, Agent, or Firm—Laff, Whitesel, Conte & Saret, Ltd.

[57] ABSTRACT

A stacked type solid electrolytic capacitor has a plurality of single plate capacitors each constituted by a dielectric oxide film, a solid electrolytic film and a negative electrode layer sequentially laminated on a surface of a positive electrode member having a positive electrode section. A metal spacer which has a thickness corresponding to each of spaces between the positive electrode sections is placed in each of the spaces. The metal spacers and the positive electrode sections are mechanically and electrically interconnected by welding. The invention may be embodied in a stacked electrolytic capacitor of a lead type or that of a chip type. The invention provides capacitor in which the size is reduced and the capacity is increased, the possibility of deterioration in electrical characteristics during the fabrication process is eliminated, and the process of fabrication is made easy.

2 Claims, 4 Drawing Sheets

STACKED TYPE SOLID ELECTROLYTIC CAPACITOR

BACKGROUND OF THE INVENTION (1) Field of the Invention

The present invention relates to a stacked type solid electrolytic capacitor, and more particularly to such a capacitor constituted by a plurality of stacked single plate capacitors each having a dielectric oxide film, a solid electrolytic film and a negative electrode member laminated on a surface of a predetermined region of a positive electrode member formed by a film-forming metal such as aluminum or tantalum having a valve action characteristic.

(2) Description of the Related Art

A conventional solid electrolytic capacitor uses a structure in which a dielectric oxide film is formed on a foil surface of a film-forming metal such as aluminum or tantalum having a valve action characteristic. On this dielectric oxide film, there is provided as solid or static electrolyte an inorganic semiconductor film of such as manganese oxide ($MnO_2$) and lead oxide ($PbO_2$), charge transfer complex such as tetracyanoquinodimethane complex, or conducting polymer such as polypyrrole and polyaniline.

In recent years, there have been demands for electric and electronic devices to be miniaturized by using smaller electronic components, while at the same time keeping or increasing electric performance, i.e., desired capacitance (microfarad of capacitance). Also, as surface mounted designs become more common, so the need for chip type electrolytic capacitors becomes greater.

In view of the above demands and needs, there have been proposed (in Japanese Patent Application Kokai Nos. 3-21006 (A) and 3-116813 (A)) electrolytic capacitors in which a foil is synthetically formed by, for example, aluminum etching, on the surface of which a dielectric oxide film is formed, with a conductive polymerized film being formed on the dielectric oxide film, thereby providing a sheet type capacitor. The electrolytic capacitor proposed can be a wound sheet type to give a wound electrolytic capacitor or can be sealed in metal case to give a sealed electrolytic capacitor. There has also been proposed (in Japanese Patent Application Kokai No. 3-145115 (A)) a laminated type solid electrolytic capacitor in which a plurality of capacitor elements (single plate capacitors) are laminated, with positive electrode sections of these capacitor elements being subjected to cold-pressure, so that the portions being pressed can be welded by laser.

FIGS. 1A and 1B show a cross-sectional view and a top view respectively of an example of the conventional stacked type solid electrolytic capacitor referred to above.

The conventional stacked type solid electrolytic capacitor shown is constituted by a plurality (four in the example) of single plate capacitors 21 stacked on top of each other, wherein the negative electrode sections are electrically and mechanically interconnected by silver paste element 23. Also, the positive electrode sections 25 extending out from the sides of the bodies of the plate capacitors are pressed together by cold-pressure process and are then laser-welded, so that the positive electrode sections 25 are mechanically and electrically interconnected at the welded portions 26.

However, in the conventional electrolytic capacitor described above, there are problems in that the curved or bent portions of the metal foils are susceptible to mechanical stresses thereby causing the deterioration of the electrical characteristics of the capacitor. Also, the gaps which unavoidably exist between the metal foils makes size reduction difficult in the fabricated capacitor.

Also, in the stacked type solid electrolytic capacitor shown in FIGS. 1A and 1B, since the positive electrode sections 25 extending out from the body portion of the plate capacitor 21 need to be joined together by a cold-pressure process, it is necessary for the positive electrode sections 25 to be made long in the direction in which they extend out. This makes size reduction difficult and also, since the base portions of the positive electrode sections are bent when they are pressed together, the metal foils of the bent portions are susceptible to mechanical stresses thereby causing the deterioration of electrical characteristics. Also, when the positive electrode sections 25 are laser-welded, it is difficult to have a plurality of metal foils thoroughly welded simultaneously.

SUMMARY OF THE INVENTION

It is, therefore, an object of the present invention to overcome the problems existing in the conventional arrangement and to provide an improved stacked type solid electrolytic capacitor in which the volume efficiency is made high, the size is reduced and the capacitance is increased, the possibility of deterioration in electrical characteristics during the fabrication process is eliminated, and the process of fabrication is made easy.

According to one aspect of the invention, there is provided a stacked type solid electrolytic capacitor having a plurality of single plate capacitors each constituted by a dielectric oxide film, a solid electrolytic film and a negative electrode layer sequentially laminated on a surface of a predetermined region of a positive electrode member formed by a film-forming metal having a valve action characteristic, the positive electrode member having a positive electrode section, the stacked type solid electrolytic capacitor comprising:

a plurality of metal spacers each of which has a thickness corresponding to each of spaces between a plurality of the positive electrode sections of the single plate capacitors and each of which is placed in each of the spaces; and a joining element mechanically and electrically joining a plurality of the positive electrode sections and a plurality of the metal spacers.

According to the present Invention, the metal spacers each having a thickness corresponding to the gap between the positive electrode sections are inserted between the positive electrode sections of the single plate capacitors. Therefore, there is no need to bend the positive electrode sections of the plate capacitors when they are electrically interconnected. That is to say, for example, by welding the end surfaces of the positive electrodes and the spacers firmly together, the positive electrode sections of the plate capacitors can be reliably electrically interconnected.

Therefore, in the stacked type solid electrolytic capacitor according to the present Invention, the length of each positive electrode section extending out from the body of the capacitor can be made short. This makes it possible to increase the volume efficiency, to reduce the size and to increase the capacitance of the fabricated capacitor. Also, since the positive electrode sections receive no mechanical stresses caused by bending action, it is possible to eliminate deterioration of electric characteristics. Furthermore, since the positive electrode sections and spacers may be pressed together and then welded at their end surfaces, the work involved in electrically interconnecting the positive electrode sections is facilitated.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention will be explained hereunder with reference to the accompanying drawings. It is to be noted that, throughout the following explanation, similar reference symbols or numerals refer to the same or similar elements in all the Figures of the drawings.

Figure 2A:
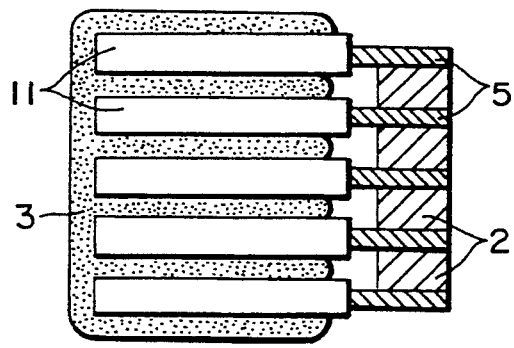
FIGS. 2A and 2B are a sectional view and a perspective view, respectively, of an embodiment of a stacked type solid electrolytic capacitor according to the invention.
Figure 2B:
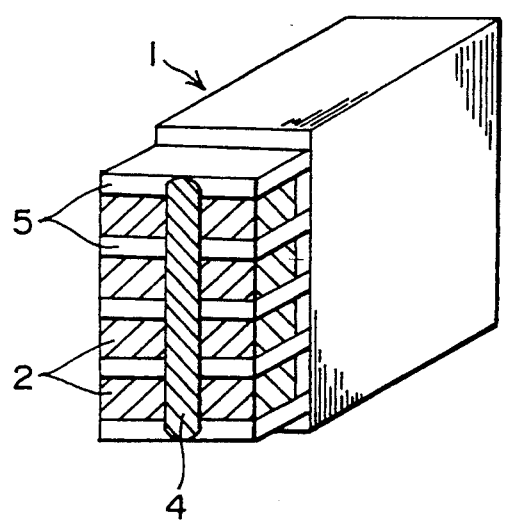

FIG. 2A is a sectional view of an embodiment of a stacked type solid electrolytic capacitor according to the invention, and FIG. 2B is a perspective view of the same shown in FIG. 2A.

The stacked type solid electrolytic capacitor according to this embodiment is constituted by a laminated capacitor assembly 1 in which a plurality (five in this example) of single plate capacitors 11 are laminated and a plurality of negative electrode sections of single plate capacitors are electrically and mechanically interconnected through a silver paste element 3. With regard to the single plate capacitors 11, the positive electrode sections 5 are led out from the sides of the bodies of the capacitors and the metal spacers 2 are inserted between the respective positive electrode sections 5. The end surfaces of both the positive electrode sections 5 and the spacers 2 are welded at a region shown by numeral 4 in FIG. 2B and the respective positive electrode sections 5 of the single plate capacitors are thus mechanically and electrically interconnected. The thickness of the spacer 2 is determined by the gaps between the positive electrode sections 5.

Figure 3A:
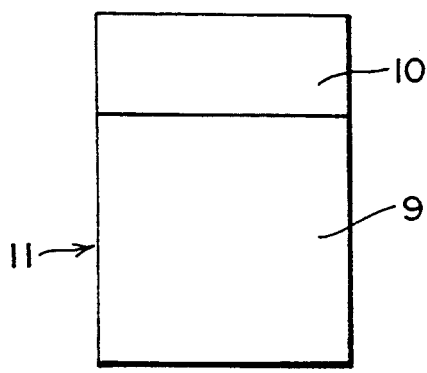
FIGS. 3A and 3B are a plan view and a sectional view, respectively, of a single plate capacitor for use in a capacitor according to the present invention.
Figure 3B:
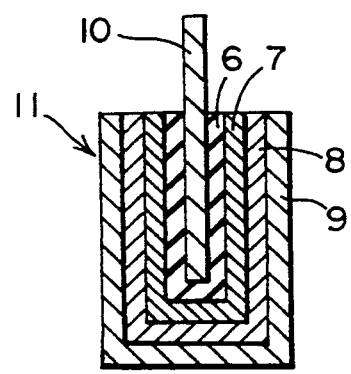

FIGS. 3A and 3B are a plan view and a sectional view, respectively, of a single plate capacitor for use in a stacked type solid electrolytic capacitor according to the present embodiment. A method for fabricating such a capacitor is now explained with reference to FIGS. 3A and 3B.

First, a metal foil 10 (or a thin metal plate) made of a film-forming metal having a valve action characteristic is cut into rectangular pieces each having a width of, for example, 3 mm. Then, a predetermined region of the foil 10 is subjected to a positive electrode oxidation process in a liquid comprising adipic acid so that a positive electrode oxide film 6 of dielectric member is formed. Then, a conducting polymer layer 7 of polypyrrole which becomes a solid electrolyte is formed on a surface of the positive electrode oxide film 6 by electrolytic polymerization or chemical polymerization. Thereafter, a graphite layer 8 for drawing out a negative electrode and a silver paste layer 9 are sequentially formed on a surface of the conductive polymerized layer 7. These processes provide the single plate capacitor 11 as shown in FIGS. 3A and 3B.

Examples of the film-forming metals having valve action characteristics are aluminum (Al), tantalum (Ta) and titanium (Ti).

Next, spacers 2 made of aluminum foils having, for example, a width of 1 mm, a length of 3 mm and a thickness of 0.15 mm are fixed between the positive electrode sections 5 of the capacitors 11 by, for example, a welding process. Then, as shown in FIGS. 2A and 2B, the single plate capacitors are stacked or laminated, and the silver paste layers 9 of the plate capacitors are electrically and mechanically interconnected by a silver paste element 3.

Thereafter, while the positive electrode sections 5 and the aluminum spacers 2 are being subjected to pressure, the end surfaces of the positive electrode sections 5 and the spacers 2 are laser-welded. Thus, the assembly 1 (stacked type solid electrolytic capacitor) as shown in FIGS. 2A and 2B is achieved.

The completed single plate capacitor 11 is shown in FIGS. 3A and 3B. A number of such single plate capacitors 11 are stacked and are connected together by a silver paste element 3. Then, the aluminum spacers 2 are inserted in the gaps between the positive electrode sections 5 and, while the pressure is being applied to the positive electrode sections 5 and the spacers 2, their end surfaces are laser-welded resulting in the laminated capacitor assembly 1.

Figure 4:
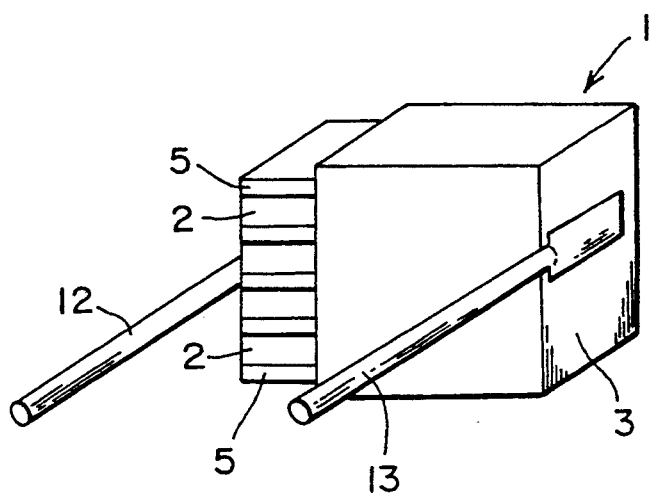
FIG. 4 is a perspective view of a lead type solid electrolytic capacitor according to the invention for explaining a part of the fabrication steps involved therein.

Next, where a lead type stacked solid electrolytic capacitor is fabricated, as shown in FIG. 4, a pair of contact point leads are attached to the capacitor assembly 1, using a conductive adhesive containing silver or a silver compound. Specifically, one lead is attached to the joining portion of the positive electrode sections 5 and the spacers 2 thereby forming a positive electrode 12, and the other lead is attached to the silver paste element 3 thereby forming a negative electrode lead 13.

Figure 5:
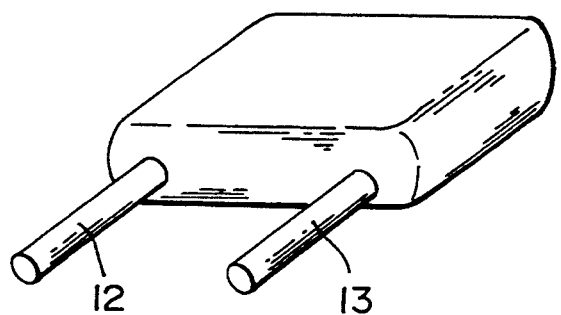
FIG. 5 is a perspective view of a lead type solid electrolytic capacitor according to the Invention for explaining a part of the fabrication steps involved therein.
Figure 6:
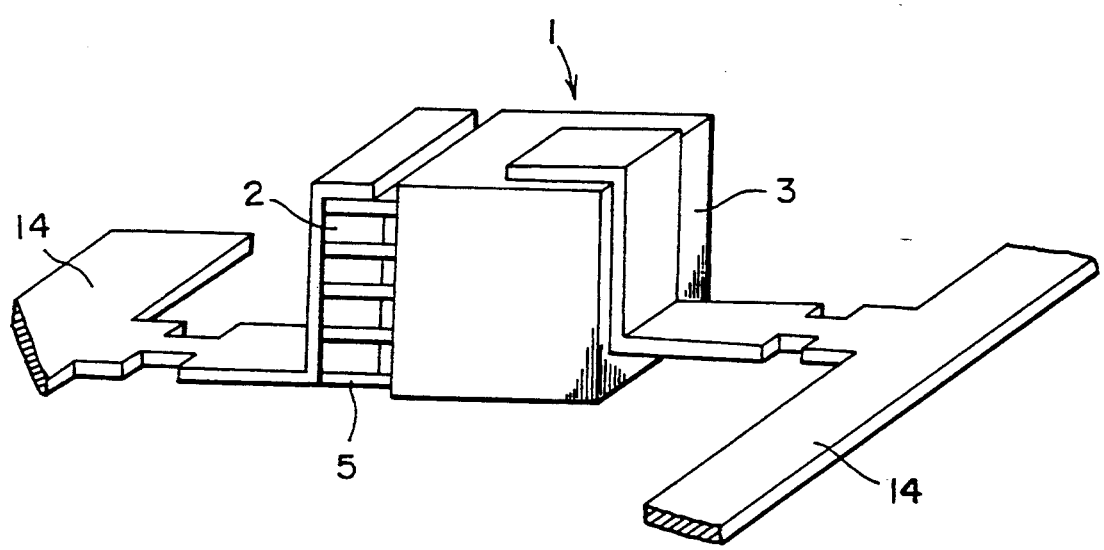
FIGS. 6 and 7 are perspective views of a chip type solid electrolytic capacitor according to the invention for explaining a part of the fabrication steps Involved therein.

Then, by using a material such as epoxy resin, the laminated capacitor assembly 1 is packed and formed into a predetermined shape as shown in FIG. 5. Thus, the fabrication of the lead type solid electrolytic capacitor is completed.

On the other hand, for the fabrication of a chip type solid electrolytic capacitor, the electrode portions provided by lead frames 14 are connected respectively to the joining portion of both the positive electrode section 5 and the spacers 2 and to the silver paste element 3 of the laminated capacitor assembly 1.

Figure 7:
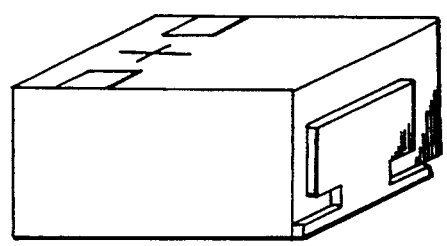

Next, as shown in FIG. 7, the capacitor assembly 1 is packed and formed into a predetermined shape by, for example, epoxy resin, and is cut from the lead frames 14. Thus, the chip type solid electrolytic capacitor is completed.

According to the invention, there is no need to bend the positive electrode sections of the respective single plate capacitors when they are interconnected and this makes the fabrication easy. Also, since the positive electrode sections can be short, it is possible to improve the volume efficiency and to reduce the size and Increase the capacitance. Furthermore, it is possible to eliminate the deterioration of electric characteristics which is otherwise caused by the mechanical stresses due to the bending of the positive electrode sections.

The resultant volume efficiency and failure rate of the stacked type solid capacitors actually fabricated according to the invention were compared with those of the prior art capacitors.

In the first example, the stacked type solid electrolytic capacitor was fabricated according to the method of the invention explained above. In the second example, such a capacitor was fabricated using aluminum wires having a diameter of 0.15 mm instead of the metal thin films for the spacers but is the same as in the first example in all other respects. The results revealed that the volume efficiency in the capacitors both in the first and the second example was improved by 30% when compared with the conventional wound type capacitor.

Figure 1A:
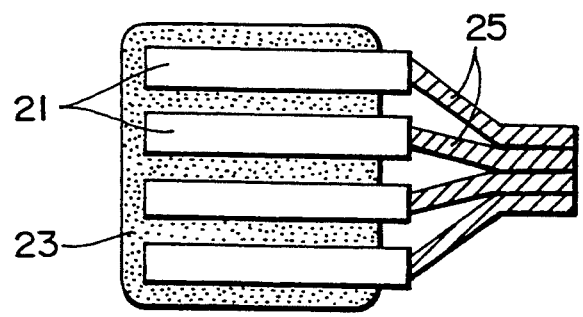
FIGS. 1A and 1B are a diagrammatic cross-sectional view and a diagrammatic top view, respectively, of an example of a conventional stacked type solid electrolytic capacitor.
Figure 1B:
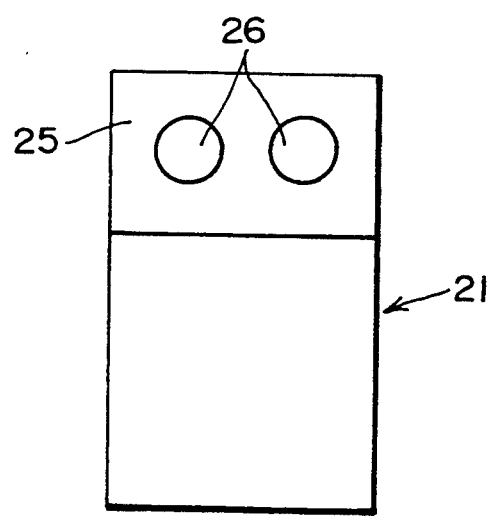

Next, the flow of leakage currents and the occurrence of open-contacts (or failures) in the capacitors of both the above examples were examined. That is, for 100 samples of the capacitors for both the first example and the second example, the leakage current test (LC test) was conducted under the conditions of the applied voltage being 10 V and the capacitance value being 4.7 $\mu F$. Also, for the prior art capacitor shown in FIGS. 1A and 1B, the LC test was conducted under the same conditions as those for the capacitors of the first and second examples. Here, the capacitors with a leakage current of 2 $\mu A$ or more are leakage current failures. Also, for 100 samples of the capacitors of the first and second examples and those of the prior art, the temperature cycle test was conducted 50 times under the temperature conditions of $-55°$ C. at a low temperature and 85° C. at a high temperature to examine the rate of occurrence of open-contacts. The results of these tests are shown in the following TABLE.

TABLE

| | EXAMPLE 1 | EXAMPLE 2 | PRIOR ART |
|---|---|---|---|
| Leakage currents | 2% | 2% | 11% |
| Open contacts | 0% | 0% | 8% |

As is apparent from the above TABLE, there is a significant decrease in both the rate of occurrence of leakage currents and that of open-contacts in the first and second examples as compared with the prior art. In the prior art, it is considered that the increase of leakage currents is caused by breakdown of oxide films due to the mechanical stresses being applied to the etched foils when the base portions of the positive electrode sections are bent.

In the above examples, the spacers inserted between the respective positive electrode sections employ aluminum films and aluminum wires, respectively. However, the spacers are not limited thereto as they can be other materials such as contact point solder plated wires, nickel solder plated wires, 42-alloy (Fe - 42% Ni) plates and phosphor bronze plates. However, as such spacers, it is preferable that they are of the same kind of metal or its alloy as that of the positive electrode of the capacitor, or of a metal forming an alloy of the positive electrode or of a metal having it as a main constituent thereof.

As has been described hereinabove, according to the invention, there is no need to bend the positive electrode sections of the respective single plate capacitors when they are interconnected and this makes the fabrication easy. Further, since the positive electrode sections can be made shorter, it is possible to improve the volume efficiency and to reduce the dimension of the capacitor and to increase the capacitance. Furthermore, it is possible to eliminate the deterioration of electric characteristics which is otherwise caused by the mechanical stresses due to the bending of the positive electrode sections.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A stacked type solid electrolytic capacitor having a plurality of single plate capacitors, each of said plates comprising a dielectric oxide film, a solid electrolytic film and a negative electrode layer sequentially laminated on a surface of a predetermined region of a positive electrode member formed by a film-forming metal having a valve action characteristic, said positive electrode member having a positive electrode section, said stacked type solid electrolytic capacitor comprising:

a plurality of metal spacers, each of said metal spacers having a thickness corresponding to each of spaces between a plurality of said positive electrode sections of said single plate capacitors and each of which is placed in each of said spaces, each of said metal spacers being a material which is the same as the material of said positive electrode member; and joining means for mechanically and electrically joining a plurality of said positive electrode sections and a plurality of said metal spacers.

2. A stacked type solid electrolytic capacitor having a plurality of single plate capacitors according to claim 1, in which said joining means is a welded element.

* * * * *